3,487,878
WELL TREATMENT
Clifton Raymond Shaw, Jr., P.O. Box 51767,
Lafayette, La. 70501
Filed Mar. 4, 1968, Ser. No. 710,046
Int. Cl. E21b 33/13
U.S. Cl. 166—295      12 Claims

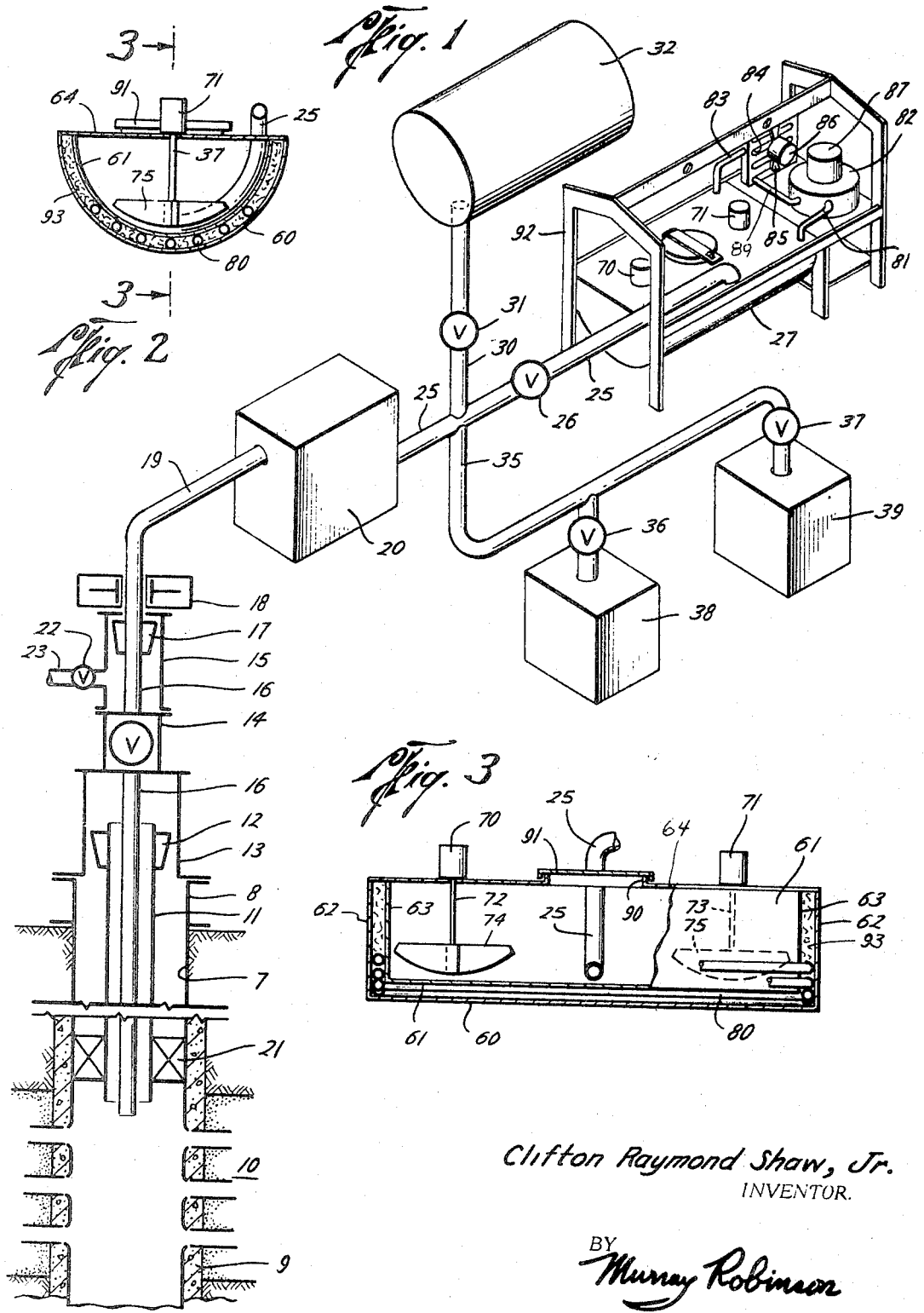

ABSTRACT OF THE DISCLOSURE

Resin forming materials comprising formaldehyde and either phenol or cresol, all at ambient temperature, are poured into a mixing tank. While the mixture is stirred, fluid refrigerant at below 30° F. flows continuously in heat exchange relationship with the mixture to cool the mixture to a temperature below 30° F., e.g. 15° F. to 25° F., usually 20° F. First powdered quanidine carbonate, then liquid sodium hydroxide, catalysts, are added, while the stirring and cooling are continued to remove heat, preferably as fast as produced by the reaction, to prevent the temperature of the mixture from rising above 40° F. and recool it to below 30° F. while preparations for injection of mixture into well formation are completed. Mixture is pumped into well while continuing the stirring and cooling of portion of mixture remaining in tank. The mixture is pumped to bottom of well and into formation around well bore with a suitable displacing substance such as kerosene. Static pressure is maintained until resin has set in formation, thereby to consolidate the formation.

BACKGROUND OF INVENTION

Field of the invention

The invention relates to the treatment of wells. Primarily, the invention relates to the injection of resin or plastic into the unconsolidated producing formation of an oil or gas well to consolidate the formation, thereby to prevent the well from sanding up.

Description of the prior art

To consolidate the formation around a well bore it has been the practice to inject a wetting agent into the formation and then inject into the formation a resin forming mix comprising a cool premix of formaldehyde and either phenol or cresol, to which premix has been added a catalyst. The initially low temperature of the premix comprising the formaldehyde and phenol (or cresol) delays the resin formation reaction that is initiated by addition of the catalyst. This allows the final resin forming mix to be injected into the formation while still in a liquid state. The mix wets the grains of the formation and causes them to adhere to each other when the resin hardens. This is one of several similar well treatment processes known as plasticizing.

The formaldehyde-phenol (or cresol) premix is prepared either by mixing precooled ingredients or else by mixing uncooled ingredients and cooling them during mixing by the addition of Dry Ice and stirring.

Usually the premix is prepared while the formation is being prepared by injection with wetting agent. After the wetting agent has been injected the catalyst is added to the cool premix and the mixture promptly pumped out of the mixing tank and into the well bore and squeezed into the formation.

Problems have been encountered with this method of plasticizing. Sometimes it is found that the wetting agent cannot be properly injected into the formation, e.g. due to insufficient perforation of the formation or clogging of the perforations with sand or debris. The formation must then be reperforated. This may take so long that the premix becomes unusable and must be discarded.

If the wetting of the formation is accomplished satisfactorily before the premix becomes unusable, catalyst is added and the mixture pumped into the well. In the presence of the catalyst the mix sets up within 90 to 100 minutes. If the mixture is not used soon enough it must be thrown away; or else the resin will set up in the mixing tank, the pump, the casing, or well bore prior to reaching the formation to be consolidated. Since it may take 20 minutes to get the mixture pumped out of the mixing tank into the well and another 30 to 60 minutes to get the mixture pumped from the top of the well to the bottom, the margin for waiting time between addition of the catalyst and commencement of pumping is very small and the slightest mechanical or other difficulty may cause such a delay that the mixture must be discarded.

SUMMARY OF THE INVENTION

It has been determined that two factors affect the useful "pot life" of the premix: temperature and time. If the premix gets too hot, then, even though the premix is fresh, when the catalyst is added the resin forming reaction will be too rapid, with the result that the mixture will set up in the tank, the pump, the well pipe, or the well bore before it reaches the formation.

If the premix warms up to above 40° F., then, even though it may not yet be so hot that it could not immediately be used, the time factor comes into play. The premix begins to react even though no catalyst has been added, and after a day or two the premix will no longer be usable. This may be due to the premix setting up in the tank, or becoming too thick to pump, or, since one would not normally wait for either of the foregoing to occur, the premix may merely have prereacted to such an extent that upon addition of the catalyst the resin will set up too fast to allow injection into the formation, the same as if the premix had gotten quite hot.

Likewise, it has been determined that the same two factors, time and temperature, determine the pot life of the final mix. The temperature rise above 40° F. caused by addition of the catalyst is a major factor in the accelerated reaction time of the mixture.

From the foregoing it has been concluded that much of the difficulty encountered with the previously known method could be overcome by keeping the premix below a temperature of 40° F. and by cooling the final mix during addition of the catalyst and thereafter to prevent excessive temperature rise and to recool the mixture to below 40° F.

However it is not practical to send the premix to the cold storage area from which the precooled ingredients were obtained, for the premix is in a large tank, as distinct from the smaller containers in which the ingredients were transported to the site. Furthermore, it is not practical to continue to cool the premix by addition of more Dry Ice due to the problem of transporting the additional Dry Ice to the site (often offshore) and the extra manpower that would be needed to add the Dry Ice continually. Recooling by addition of Dry Ice after addition of catalyst is not possible since the Dry Ice would react unfavorably with the resin mix.

According to the invention the resin forming mixture is cooled by continuously flowing a fluid refrigerant in heat exchange relationship with the mixture from the time mixing is commenced and during any initial waiting period while the formation is being readied to receive the resin mix, through the addition of the catalyst and thereafter during any further waiting period and finally during the period the mixture is being pumped from the tank. This makes it possible to mix the formaldehyde and cresol or phenol prior to wetting the formation without fear that delay is preparing the formation to receive the wetting agent will necessitate discarding the premix, there being no problem with the premix warming up prior to addition of the catalyst. Prior to the addition of catalyst, the premix, cooled to below 40° F., can be kept for up to a month without adverse effect. Furthermore, after the catalyst has been added, there is no danger of having to discard the mix, because by recooling it the mix can be kept for up to eight hours before it must be pumped into the well. Better coordination of the time of addition of catalyst and preparation of the well to receive the resin forming mixture is therefore possible. In addition, since the mix is cooled while being pumped from the tank there is added about 20 minutes to the time available for getting the mixture from the top to the bottom of the well. Furthermore, there is no adverse effect on the resin from the addition of extraneous materials such as carbon dioxide (which reacts adversely with the mix once the catalyst has been added). The cooling system is entirely portable. There is eliminated the need for transportation of precooled materials or cooling agents in insulated or refrigerated containers. There results a considerable saving by elimination of discarded batches of resin forming mixture and the danger of an imperfect job due to premature setting of the resin is substantially reduced.

BRIEF DESCRIPTION OF THE DRAWING

FIGURE 1 is a schematic view showing a well being treated by a method in accordance with the invention; and
FIGURES 2 and 3 are respectively a longitudinal section and a transverse section through a cooling tank suitable for use with the invention.

DESCRIPTION OF THE PREFERRED EMBODIMENT

Referring now to FIGURE 1 there is shown a well casing 7 suspended from casing head 8 and cemented at its lower end at 9. Around the casing there is a producing formation 10 to be consolidated. A tubing 11 is suspended in the well by hanger 12 in tubing head 13. A master valve 14 surmounts the tubing head and controls flow to and from the tubing. Above the master valve is a temporary well head 15 in which work string 16 is suspended from hanger 17. Above head 15 is a blowout preventer 18.

The work string is connected by conduit 19 to the outlet of a pump 20 capable of pumping at sufficient pressure to overcome formation pressure and pump liquid down the work string and back up the tubing 11, the casing annulus being blocked off by packer 21. Fluid pumped back up tubing 11 may exit through a side port in the temporary well head 15 and wing valve 22 to a return flow line 23.

The inlet of pump 20 is connected by conduit 25 through shutoff valve 26 to mixing tank 27. A branch conduit 30 leads from the conduit 25 through shutoff valve 31 to storage tank 32. A suitable displacing medium or substance such as diesel oil, lease oil, kerosene, water, or other liquid may be stored in tank 32. A gaseous displacing medium may also be used, in which case however pump 20 would be replaced by an air compressor. Another branch conduit 35 leads from conduit 25 through shutoff valves 36 and 37 to storage tanks 38 and 39 for storing plain salt water and salt water containing a wetting agent.

Referring now also to FIGURES 2 and 3, the mixing tank 27 may include a housing 60, which may be made of stainless steel, having a semicylindrical shape, an inner stainless steel lining 61, also of semicylindrical shape, outer and liner end plates 62, 63, and a flat top plate 64. The lining can be omitted if desirable.

The mixing tank is provided with stirring means comprising two hydraulic motors 70, 71. The motors are mounted adjacent the two ends of the tank and are supported by the top plate 64. Vertical shafts 72, 73, rotatably driven by motors 70, 71, carry paddles 74, 75 at their lower ends.

Between housing 60 and lining 61 there are a plurality of turns of tubing 80, the ends of which are connected respectively to the inlet 81 of refrigerant compressor 82 and to the outlet 83 of heat exchanger (air radiator) 84. A fan 85 flows air over heat exchanger 84. The fan and compressor are driven by hydraulic motors 86, 87. The refrigerant circulated from compressor 82 through conduit 89 to heat exchanger 84 and through cooling coils 80 may, for example, be Freon. Other liquid or gaseous refrigerant fluids may be used such as nitrogen, ammonia, carbon dioxide. A secondary refrigerating system using ammonia or chilled liquids in coils 80 could also be used.

One or more hatches 90 with suitable fluid tight covers 91 may be provided in the top plate of the mixing tank through which materials can be introduced into the tank.

It will be understood that the sizes of the various pieces of apparatus used in carrying out the invention will vary according to the vertical extent, e.g. one foot to forty feet, typically 6 feet, of the formation to be consolidated, and the radial extent to be penetrated, e.g. three feet, which determines the amount of resin forming material to be mixed, and upon the depth and pressure of the formation to be consolidated, which in turn controls the pressure requirements placed on the injection pump. The well temperature governs the choice of resin components. Although these and other controlling factors will vary, a better appreciation of the nature of the process will be obtained from a few examples of the specifications of some of the apparatus components.

A suitable mixing tank may be four feet high, four feet wide, and ten feet long. A frame of steel bars 92 protects the equipment at the top of the tank and facilitates lifting the tank with a derrick from the transport boat or vehicle to the well platform or rig floor. The tank may have a capacity of 600 gallons. The paddles 74, 75 may be rotated at 100 r.p.m. by hydraulic motor of 18.5 horsepower capacity.

The heat exchange coils 80 and the compressor 82 may provide sufficient cooling capacity to reduce the temperature of the resin mix, prior to introduction of the catalyst, at a rate of 25° to 30° F. per hour. The hydraulic motor driving the compressor may have a rating of 5.5 horsepower. The power requirements are reduced by insulating the mixing tank as shown at 93.

Hydraulic motors are desirable for driving the compressor, cooling fan 85 and the stirring paddles as a safety precaution, especially in the case of offshore wells, to minimize the danger of fire. For this reason electric or gasoline motors are not ordinarily used. Diesel engines may be used however, either for direct drive or to drive the pump of the hydraulic system.

The injection pump 20 may be a high pressure single action, triplex pump with capacity of 10 to 50 gallons per minute at up to 10,000 p.s.i. pumping diesel oil. Since formation pressure usually varies with depth at 0.433 p.s.i. per foot of depth, such a pump could handle wells 10,000 feet and more in depth.

In carrying out the process, formaldehyde (HCHO), e.g. a 37% aqueous solution inhibited with methanol (min. 13.5%, max. 15%) is mixed in proper chemical combining (condensing) ratio with either cresol ($CH_3C_6H_4OH$), e.g., 3° meta- para-, or phenol ($C_6H_5OH$), e.g., technical grade (85% phenol). Cresol is used if the temperature of the formation to be consolidated is 174° F. or below. Phenol is used for higher formation temperatures. These resin components, which may have been stored at ambient temperature, e.g., 70° F. or any other temperature encountered in the field, e.g., below freezing up to over 100° F., are poured into the mixing tank and stirred and cooled to a temperature below 30° F., e.g., in the range 15° F. to 25° F., typically 20° F. The mixture can be cooled to this low temperature without freezing since the freezing point is around −25° F. For a typical 335-gallon batch, 275 gallons of the formaldehyde solution would be mixed with 55 gallons of the phenol or cresol liquid. The mixing may take 5 minutes, and an hour or two may be consumed in cooling it to 20° F.

While the resin mix is being cooled, the formation may be prepared to receive it. To this end the valve 36 may be opened and a spearhead of 126 gallons (3 barrels) of a 10% by weight solution of sodium chloride in water from tank 38 pumped down the pipe forming the work string 16. The salt solution is prepared by adding approximately 30 lb. of NaCl per barrel (300 lb.) of water.

Next valve 36 is closed and valve 37 opened and a quantity of salt water with wetting agent pumped from tank 39 into the work string. A silicone type wetting agent is used, for example a product sold by Dow Chemical Company as Dow-Corning Z–6020 may be used. Two gallons of Z–6020 added to five barrels (210 gallons) of 10% NaCl aqueous solution produces a one percent strength wetting agent liquid in sufficient quantity for a 335-gallon batch of resin mix.

If the quantity of resin mix is varied, the amount of wetting agent liquid is varied in direct proportion. For example, if a 12-barrel (504 gallons) batch of resin were to be used, 7½ barrels of wetting agent solution would be required.

After the wetting agent liquid has been pumped into the well, a tail shot or spacer of 3 barrels (126 gallons) of the plain 10% sodium chloride solution in water is pumped in. The amount of the tail shot and the spearhead of salt water may be constant and independent of the quantity of plastic resin mix to be injected into the formation.

The flushing and wetting of the formation with the salt water and wetting agent may take 30 to 60 minutes. Usually therefore, the flushing and wetting can be accomplished while the resin mix is being cooled.

After the resin mix has been cooled and the well flushed, wetted, and otherwise readied to accept the plastic, guanidine carbonate (a catalyst in powder form) is added to the resin mix. Addition of the catalyst may take two or three minutes. Only a small quantity of such catalyst is required, e.g. up to 4½ lb. for 335 gallons (8 barrels) of resin mix, less being required if the well temperature is higher. The addition of this catalyst creates heat tending to raise the temperature of the mix 3° F. to 10° F. in the absence of refrigeration. However by flowing the refrigerant in coils 80 in heat exchange relationship with the resin mix, the temperature can be kept well below 30° F. Desirably heat is removed as fast as it is generated, but the mix temperature typically may rise to 25° F. Stirring and cooling are continued during the 3 or 4 added minutes required for the catalyst to dissolve and thereafter. The total time for adding the powdered catalyst and dissolving it may amount to five minutes more or less. When the powdered catalyst is completely dissolved, the liquid catalyst, a 50% sodium hydroxide aqueous solution, is slowly added to the mix in the tank over a period of perhaps 5 minutes. For a 335-gallon batch of resin mix, twelve gallons of sodium hydroxide solution (52 pounds dry NaOH dissolved in water) is added. This immediately starts the reaction to form the synthetic resin, and generates considerable heat, e.g. four times as fast as the powdered catalyst. Absent continued refrigeration a temperature rise to 80° F. may occur. Since the plastic mix must be put in the formation in about 90 min. to 100 min. after the temperature rises above 40° F., this would necessitate its immediate use. However by flowing refrigerant in heat exchange relationship with the mix, the mix typically is cooled fast enough to prevent the temperature from rising above 35° F. Stirring and cooling are continued and unless the mix is used immediately the temperature is brought back to 20° F.

If the well formation is ready, pumping of the mix into the well may be started as soon as the addition of the liquid catalyst has been completed even though cooling may not have been sufficient to keep the temperature below 40° F. and even though recooling has not yet been completed. In any event stirring and cooling of the mix in the tank will be continued while the mix is being pumped. The pumping time may be 15 to 30 minutes to get the mix out of the tank, so that there is a considerable amount of recooling effected even if pumping of the mix is begun immediately after addition of the catalysts is completed.

After the mixing tank has been pumped out, or all the desired mix has been pumped into the well, the valve between the mixing tank and pump is closed and that between the diesel oil storage tank and the pump is opened. Enough diesel oil, or other displacing substance, is pumped into the well after the resin mix to displace the mix out of the pump, casing, and well bore into the formation. A little more displacing medium then that required is pumped down to make sure all the plastic resin mix is purged from the well and injected into the formation.

The well is then shut in for at least 8 hours, maintaining hydrostatic pressure of the oil on the formation. The well is not produced for at least 12 hours. However after the 8-hour shutin period and prior to beginning of production, various operations such as reverse circulating the diesel oil out of the work string and replacing the oil with salt water, washing the formation with salt water, and removing the work string could be performed.

While a preferred embodiment of the invention has been described, many modifications thereof can be made by one skilled in the art without departing from the spirit of the invention.

I claim:
1. Process of treating a well to consolidate the producing formation comprising the steps of
    mixing formaldehyde with phenol or cresol in condensing proportions to form a batch of resin mix,
    continuously flowing a fluid refrigerant in heat exchange relationship with the mix to cool the mix to below 30° F.,
    adding catalyst to the mix which will initiate rapid condensation of the formaldehyde and the phenol or cresol if the temperature is in excess of 40° F.,
    continuously flowing a fluid refrigerant in heat exchange relationship with the mix during and after the addition of catalyst to withdraw heat generated by addition of catalyst at a withdrawal rate sufficient to keep the temperature below 40° F., and
    introducing the mix into the well formation

2. Process of claim 1 in which the flow of refrigerant in heat exchange relationship with the mix is effected while the mix is in a mixing tank,
    the mix is pumped from the tank into the well formation through a pipe, and
    the flow of refrigerant in heat exchange relationship with the mix to withdraw heat therefrom is continued while the mix is being pumped from the tank into the pipe.

3. Process of claim 2 wherein the flow of refrigerant in heat exchange relationship with the mix to withdraw heat therefrom is continued during a waiting period of up to eight hours after catalyst has been added and prior to pumping the mix out of the tank, the temperature of the mix being thereby reduced to below 30° F.

4. Process of claim 3 wherein during the waiting period there is completed the preparation of the well formation to receive the mix.

5. Process of claim 1 wherein while the mix is being cooled to below 30° F. and prior to the addition of catalyst a wetting agent is introduced into the formation.

6. Process of claim 1 wherein
    the addition of catalyst is in two stages:
    first, guanidine carbonate is added to the mix,
    second, sodium hydroxide is added to the solution, and prior to the addition of catalyst the mix is cooled to the temperature range of 15° F. to 25° F.

7. Combination of claim 1 wherein the rate of cooling effected by the flow of the refrigerant is enhanced by stirring the mix during the cooling thereof.

8. Process of claim 1 including after mixing of the formaldehyde with the phenol or cresol the step of continuously flowing fluid refrigerant in heat exchange relationship with the mix to cool it below 40° F. and thereafter waiting up to one month before carrying on the remainder of the process.

9. In a process of plasticizing a formation around an earth bore comprising the steps of preparing a cool premix of resin-forming ingredients including formaldehyde and material selected from the group consisting of phenol and cresol, said cool premix having a temperature below 40° F.

activating the premix by adding to the premix catalyst means exothermically to initiate physico-chemical action to convert the premix more rapidly to resin, and injecting the activated mix into the formation, the improvement comprising cooling the premix during the activation thereof to keep the temperature below 40° F.

10. Process of claim 9 wherein the premix prior to addition of catalyst is cooled to below 30° F. and including the further step of recooling the activated premix to below 30° F. prior to injection into the formation.

11. Process of claim 9 wherein the premix is maintained at a temperature below 30° F. until the catalyst is added.

12. Process of claim 9 wherein the premix is prepared in a tank and is activated in the tank and including the further step of cooling the remaining contents of the tank while the contents of the tank are pumped into the earth bore and injected into the formation.

References Cited

UNITED STATES PATENTS

| | | | |
|---|---|---|---|
| 2,366,036 | 12/1944 | Leverett et al. | 166—33 |
| 2,476,015 | 7/1949 | Wrightsman | 166—33 |
| 2,674,322 | 4/1954 | Cardwell | 166—33 X |
| 2,770,306 | 11/1956 | Clark | 166—33 |
| 2,772,737 | 12/1956 | Bond et al. | 166—57 X |
| 2,986,538 | 5/1961 | Nesbitt et al. | 166—33 X |
| 3,047,677 | 7/1962 | Williams et al. | 166—33 |
| 3,097,692 | 7/1963 | Holland et al. | 166—33 |
| 3,193,014 | 7/1965 | Hill | 166—57 |

STEPHEN J. NOVOSAD, Primary Examiner

U.S. Cl. X.R.

166—300